United States Patent Office 3,449,470
Patented June 10, 1969

3,449,470
PEROXIDE-CURED BLENDS OF DIENE RUBBERS AND ABS GRAFT COPOLYMER
Thomas S. Grabowski, Vienna, W. Va., assignor to Borg-Warner Corporation, Chicago, Ill., a corporation of Illinois
No Drawing. Filed Mar. 11, 1965, Ser. No. 439,064
Int. Cl. C08f *37/18*
U.S. Cl. 260—876
3 Claims

ABSTRACT OF THE DISCLOSURE

Low light reflection rubber-resin blends prepared from rubbery materials comprised of conjugated diene-monovinyl aromatic hydrocarbon copolymers and conjugated diene-acrylic acid nitrile copolymers combined with a resinous material comprised of emulsion polymerized graft copolymers prepared from polymerized conjugated diene and a mixture of monovinyl aromatic hydrocarbon and an acrylic acid nitrile polymerized in the presence of the polymerized conjugated diene and a copolymer prepared from monovinyl aromatic hydrocarbon copolymerized with an acrylic acid nitrile and from about .2 to 2 percent by weight of a peroxidic catalyst.

---

The present invention relates to rubber-resin blends having new and improved properties. More particularly, this invention relates to thermoplastic mixtures of rubber and resin materials that are characterized by having high heat distortion temperature, high impact and tensile strengths, and good moldability and processability. These materials are further characterized in that they have low light reflective qualities.

Many of the previously known thermoplastic compositions have exhibited good impact strength and good moldability; however, they have been lacking in low temperature properties as well as having the characteristic of being high in light reflective qualities. The prior compositions did not have the desirable combination of physical properties necessitated for materials utilized in the fabrication of luggage, carrying cases, protective helmets, and the like.

The present invention is directed to improved compositions which are hard, tough, flexible materials with high impact strength which makes them suitable for use in various molded shapes. These compositions are particularly suitable for applications where great resistance to deformation under high impact is required. The compositions of the present invention as aforementioned are low in light reflective qualities and have a dull surface finish appearance.

Briefly described, the compositions of the present invention are comprised of two primary components, i.e., a synthetic rubber component and a resin component. The synthetic rubber portion is comprised of from about 5 percent to about 45 percent by weight of the total composition and the resin component is correspondingly from about 95 percent to about 55 percent by weight of the total rubber-resin composition.

THE SYNTHETIC RUBBER

The synthetic rubber component of the blends of this invention is a mixture of from about 10 percent to about 90 percent conjugated-diene—nitrile copolymer and from about 10 percent to about 90 percent conjugated-diene—monovinyl aromatic hydrocarbon copolymer.

The conjugated-diene—nitrile copolymers are prepared by copolymerizing from about 80 parts by weight to about 50 parts by weight of a conjugated-diene monomer having 4 to 6 carbon atoms, such as butadiene, isoprene, piperylene, dimethyl butadiene, chloroprene, or a mixture thereof with correspondingly from about 20 parts by weight to about 50 parts by weight of acrylic acid nitrile such as acrylonitrile, methacrylonitrile, ethacrylonitrile, chloroacrylonitrile, or mixtures thereof.

The preferred monomers are butadiene and acrylonitrile, and are preferably combined so as to contain from about 25 to 45 parts by weight of acrylonitrile and correspondingly from about 75 parts to about 55 parts by weight of butadiene.

The conjugated-diene—acrylic acid nitrile copolymers are normally prepared by emulsion polymerization. The monomers are emulsified in from about 50 to 400 parts of aqueous medium such as water per 100 parts of total monomers. In all, a great variety of emulsifying agents are suitable for this purpose. Most commonly, about 0.5 to 5 parts of an acrylic soap of a saturated or unsaturated $C_8$ to $C_{24}$ higher fatty acid such as caprylic, carnaubic, lauric, or mixed coconut oil acids are used, sodium or potassium oleate or stearate, or the corresponding ammonium soaps are preferred. It may be desirable to have a slight excess of free fatty acid or free alkali in the emulsion. For example, the soap may be prepared in situ by neutralizing oleic acid by 9/10 of an equivalent of sodium hydroxide. In addition to or in place of the fatty acid soap, another emulsifier such as a formaldehyde condensation product of naphthalene sulfonic acid or sodium lauryl sulfate, sodium tetraisobutylene sulfonate, or aromatic alkyl sulfonate salts, etc., may be used. 0.5 to 1.5 parts of a primary or tertiary aliphatic mercaptan having at least 6 and up to about 18 carbon atoms, e.g., dodecyl mercaptan or its commercial mixture comprising a major portion of dodecyl with minor amounts of other mercaptans in the $C_6$ to $C_{18}$ range, or other modifiers such as diisopropylene, dixanthogen disulfide or likewise beneficially modify the polymerization.

All the mercaptan may be added to the emulsion initially although it is preferred that additions of mercaptan may be made to the systems in increments, e.g., at 20 to 25 percent and at 45 to 50 percent overall conversion or alternately continuously.

As a catalyst, in all, a number of oxygen yielding substances such as hydrogen, peroxide, benzoyl peroxide, cumene hydroperoxide, alkali persulfates or perborates or mixtures thereof are used. Conveniently, the catalyst may be used in concentrations of about .03 to 2 percent based on the weight of reactive monomers, 0.3 to 0.5 percent of potassium persulfate being preferred. Further modification of the polymerization reaction may be accomplished by carrying out the polymerization in a so-called redox system described, for example, in Industrial and Engineering Chemistry, vol. 40, pp. 769–777 and 932 through 937 (1948). The polymerization is usually carried out at temperatures between 10° and 70° C. The polymerization is carried to a conversion of about 60–100 percent, preferably about 70–95 percent and takes about 10–15 hours depending on the particular polymerization formula selected. Polymerization times may range anywhere from between 4 and 24 hours as is well known in the art.

The conjugated-diene—monovinyl aromatic hydrocarbon copolymer portion of the synthetic rubber of this invention is obtained by copolymerizing a conjugated-diene monomer such as butadiene, isoprene, etc., as above set forth and a monovinyl aromatic hydrocarbon monomer such as styrene, α-methylstyrene, and mixtures thereof. The diene monomer is present in amounts from about 50 parts by weight to about 95 parts by weight of the total composition. Correspondingly, the monovinyl aromatic hydrocarbon component comprises from about 5 parts by weight to about 50 parts by weight of the total composition.

The conjugated-diene portion of the synthetic rubber is preferably butadiene and the monovinyl aromatic hydrocarbon monomer is preferably styrene and they are present in the copolymer in amounts of from about 60 parts by weight to about 80 parts by weight butadiene with correspondingly from about 20 parts by weight to about 40 parts by weight styrene. The butadiene-styrene copolymer may also be a block copolymer.

Methods of making the conjugated-diene—monovinyl aromatic hydrocarbon copolymers are well known. The copolymers are usually prepared by dispersing a mixture of the monomers in an aqueous solution of an emulsifying agent, then agitating, heating and copolymerizing the monomers.

The polymerization is accelerated by the addition of catalysts which provide free radicals such as hydrogen peroxide, benzoyl peroxide, tertiary-butyl hydroperoxide, cumene peroxide, potassium sulfate, etc. In the making of block copolymers, organolithium catalysts may be used as is well known in the art. The catalyst is usually employed in amounts corresponding to from about 0.1 to 2 percent by weight of the materials to be polymerized.

The conjugated-diene—monovinyl aromatic hydrocarbon copolymers are usually obtained by stopping the polymerization short of completion, e.g., to when from about 70 to 90 percent by weight of the monomers are polymerized, then separating the unreacted monomers and recovering the copolymer from the latex in a manner well known in the art such as by coagulation of the latex, washing and drying the copolymer or by drying of the latex on rolls or spray drying.

In the making of the two rubbery copolymers as above set forth, the butadiene may be replaced wholly or in part by other dienes as above mentioned, the acrylonitrile may be replaced wholly or in part by other acrylic acid nitriles as above set forth and the styrene may be replaced wholly or in part by other polymerizable monovinyl aromatic hydrocarbons which have the vinyl radical directly attached to the aromatic nucleus.

THE RESIN

The resin portion of he blends of this invention are comprised of mixtures of from about 45 percent to about 95 percent monovinyl aromatic hydrocarbon-nitrile copolymers with from about 5 percent to about 55 percent graft polymers.

The monovinyl aromatic hydrocarbon-nitrile copolymers will contain from about 15 parts by weight to about 40 parts by weight of nitrile (as above defined with respect to the rubber component) and correspondingly from about 85 parts by weight to about 60 parts by weight of monovinyl aromatic hydrocarbon as above defined with respect to the rubber component. The monovinyl aromatic hydrocarbon utilized in making the resinous copolymer is preferably styrene and is contained in amounts from about 80 parts by weight to 65 parts by weight. The nitrile utilized is preferably acrylonitrile and is present in the copolymer within the range of from about 20 parts by weight to about 35 parts by weight. With other factors being equal, the increase in the nitrile content of the copolymer will cause an increase of the modulus of the elasticity and the impact strength of the rubber-resin blends.

The acrylic acid nitrile-monovinyl aromatic hydrocarbon copolymers may be prepared as exemplified by the following preparation of acrylonitrile-styrene copolymer. The following components are utilized in the preparation of a styrene-acrylonitrile copolymer.

| | Parts by weight |
|---|---|
| Acrylonitrile | 30 |
| Styrene | 70 |
| Disproportionated rosin acid sodium salt | 2 |
| Potassium persulfate | 0.25 |
| Tertiary dodecyl mercaptan | 0.2 |
| Water | 180 |

The formula is prepared by dissolving the persulfate and rosin acid soap in the water. A second mixture is made of the acrylonitrile monomer and styrene monomer with mercaptan. The reaction may take place in a 1,500 ml. flask with continuous agitation at 75° C. The water phase is heated to temeprature, 10 percent of the mixed monomer is charged to the vessel and allowed to exotherm. The remaining monomers are continuously charged to the reactor at a uniform rate over a two-hour period. When the reaction is complete, the copolymer is cooled coagulated with sulfuric acid (two parts/100 parts polymer) by adding the copolymer to the dilute acid solution and heating the mixture to 95° C. to obtain a workable resin particle size. The resin is washed, filtered, and dried at 60° C. The inherent viscosity of the polymer (0.2 g./100 ml. solvent) when measured in methylethylketone solution at 25° C. is about 0.92.

The graft copolymers which are blended with the monovinyl aromatic hydrocarbon-nitrile copolymers of this invention are high copolymers containing molecules which consist of two or more polymeric parts of different composition which are chemically united together.

A graft polymer suitable for use in the production of the blends of this invention may be prepared by the interaction under polymerization conditions of polybutadiene (large particle size, i.e., majority in excess of 1,600 angstroms), or another conjugated diene, such as above described, which diene may be combined with a monomer polymerizable therewith such as styrene, with a mixture of acrylic acid nitrile and mononuclear aromatic hydrocarbons. The acrylic acid nitrile and monovinyl aromatic hydrocarbon are grafted on the polybutadiene or butadiene copolymer base by being polymerized in the presence of the prepolymerized polybutadiene or copolymer. The preferred composition of the graft polymer utilized in this invention is polybutadiene having styrene and acrylonitrile grafted thereon. The polybutadiene of the preferred graft copolymer is present in amounts from 20 parts to about 60 parts by weight having acrylonitrile in amounts from 10 parts to about 30 parts by weight and styrene in amounts from 30 parts to about 70 parts by weight grafted thereon.

The graft polymer of a polymerized conjugated-diene or conjugated-diene copolymer having acrylic acid nitrile and monovinyl aromatic hydrocarbon grafted thereon may be exemplified by the preparation of polybutadiene-acrylonitrile-styrene graft polymer. The graft polymer is prepared by first preparing the polymerized conjugated-diene rubber component. The conjugated-diene rubber component is prepared by injecting the following ingredients into a reactor and polymerizing the same for 40 hours at about 65° C.

| | Parts by weight |
|---|---|
| Butadiene | 100 |
| Water | 80 |
| Sodium oleate | 1 3 |
| $K_2S_2O_8$ | 0.25 |
| Dodecyl mercaptan | 0.15 |
| Sodium hydroxide | 0.014 |

[1] One part of soap was initially charged, followed by two or more parts during the polymerization reaction.

The polymerized butadiene (polybutadiene) was analyzed to determine the particle size using a conventional electron microscope. The majority of the particles were above 1,600 Angstroms.

The graft polymer is prepared by charging the following ingredients in a pressure-tight reactor which is maintained at a temperature of 65° to 85° C. for three hours, at which time the reaction is essentially complete.

| | Parts by weight |
|---|---|
| Polybutadiene (large particle size as above prepared) | 50 |
| Acrylonitrile | 18 |
| Styrene | 32 |
| Cumene hydroperoxide | 0.75 |
| Sodium salt hydrogenated disproportionated resin | 6.0 |
| Sodium pyrophosphate | 0.5 |
| Sodium hydroxide | 0.15 |
| Sodium salt of condensed alkyl napthalene sulfonic acid | 0.15 |
| Dextrose | 1.0 |
| Ferrous sulfate | 0.01 |
| Mixed tertiary mercaptan (60:20:20 $C_{12}C_{14}C_{16}$) | 0.5 |
| Water, including water present in the polybutadiene latex | 160.0 |

The graft polymer formed was recovered by coagulating the final reaction mixture with dilute brine and sulfuric acid, heating to 95° C. to produce partial granulation, filtering, washing with water, and drying to constant weight at 110° C.

As indicated with respect to the first resinous copolymer and with respect to the copolymers of the rubber portion of the rubber-resin blends, the styrene in the graft polymer may be replaced in whole or in part by other polymerizable monovinyl aromatic hydrocarbon compounds, the polybutadiene may be replaced in part by other polymerized conjugated-dienes and diene compounds, and the acrylonitrile may be replaced in whole or in part by other acrylic acid nitriles.

With respect to the rubber-resin blends of this invention, the rubber portion may be present in amounts from about 5 percent up to about 45 percent of the total composition and the resinous portion will correspondingly be present in amounts from about 95 percent to about 55 percent of the total composition.

The compositions of this invention are compounded by intimately mixing the several rubber and resin components together to form a uniform homogeneous mixture in any suitable way, such for example, as an open rubber mill or a Banbury mixer.

In mixing the rubber-resin components, a peroxidic catalyst such as dicumyl peroxide, cumene hydroperoxide, or the like is added in amounts from about 0.2 to 2 parts by weight of the total rubber-resin composition. The temperature is maintained at from about 300° F. to about 400° F., i.e., above the melting point of the rubber-resin components. Small amounts of other additives such as stabilizers, lubricants, fillers, antioxidants, and plasticizers may be used.

The compositions of this invention can be drawn into objects of commercial value as above set forth, using wood or metal molds, or the composition may be vacuum-molded into cabinets, helmets, luggage and the like. The finished fabricated articles from these materials have excellent dimensional stability and sufficiently high heat distortion temperatures so as to hold any shape into which they are fabricated. Their excellent impact strengths insure freedom from cracking or shattering under stresses or shocks likely to be encountered in service. Their excellent impact strength is also retained at low temperatures, which is important for many different applications.

With the foregoing general discussion in mind, it will be understood that this invention may be used in a variety of different applications. In the examples, all percentages and parts are by weight.

EXAMPLE I 50 parts of a styrene-acrylonitrile copolymer containing 30 percent by weight acrylonitrile and 70 percent by weight styrene was blended with 45 parts graft polymer containing 50 parts by weight polybutadiene, 18 parts by weight acrylonitrile, and 32 parts by weight styrene. This resinous composition was mixed with 5 parts of a masterbatch rubber composition comprised of a 70/30 butadiene-acrylonitrile copolymer containing a 30/70 styrene-butadiene block copolymer, and 0.4 parts by weight of dicumyl peroxide (40 percent suspended on calcium carbonate), one part by weight of magnesium stearate, and 0.25 parts by weight of an antioxidant, and .02 parts of magnesium oxide were added along with a rubber-resin component. The rubber-resin components along with additives were placed in a Banbury mixer at a temperature of about 350° F. and mixed continuously until the rubber-resin composition had a uniform homogeneous consistency (about one to three minutes). The resulting blend was molded into test samples and the following properties were found: tensile strength, elongation, tensile modulus, notched izod impact, hardness Rockwell R scale. The properties for Examples I through XI are set forth in Tables I and II hereinbelow. Examples II through XI were performed in the same manner as Example I and the rubber-resin components were varied as set forth in Table I.

TABLE I

| | I | II | III | IV | V | VI |
|---|---|---|---|---|---|---|
| Styrene-Acrylonitrile Copolymer (70/30) | 50 | 50 | 45 | 45 | 65 | 60 |
| Graft Polymer: Polybutadiene-Styrene-Acrylontrile (50/32/18) | 45 | 5 | 10 | 45 | 5 | 30 |
| Butadiene-Acrylonitrile Copolymer (70/30) | }30/70 | 45 | 45 | 10 | 30 | 10 |
| Styrene-Butadiene Copolymer (30/70) | 5 | | | | | |
| Dicumyl Peroxide (40% on CaCO$_3$) | 0.40 | 0.40 | 0.40 | 0.40 | 0.40 | 0.40 |
| Magnesium Stearate | 1.00 | 1.00 | 1.00 | 1.00 | 1.00 | 1.00 |
| Antioxidant | 0.25 | 0.25 | 0.25 | 0.25 | 0.25 | 0.25 |
| Magnesium Oxide | 0.20 | 0.20 | 0.20 | 0.20 | 0.20 | 0.20 |
| Tensile at Yield (p.s.i.) | 5,200 | 3,300 | 3,000 | 4,600 | 5,000 | 5,800 |
| Elongation at Break (percent) | 27 | 13 | 10 | 57 | 58 | 40 |
| Tensile Modulus (×10$^5$) | 2.5 | 1.9 | 1.6 | 2.2 | 2.8 | 2.7 |
| Notched Izod Impact (ft. lbs./in.) | 8.2 | 7.2 | 8.1 | 11.3 | 4.6 | 7.1 |
| Hardness—Rockwell R Scale | 91 | 37 | 21 | 87 | 85 | 96 |

TABLE II

| | VII | VIII | IX | X | XI |
|---|---|---|---|---|---|
| Styrene-Acrylonitrile Copolymer (70/30) | 75 | 45 | 75 | 65 | 65 |
| Graft Polymer: Polybutadiene-Styrene-Acrylontrile (50/32/18) | 15 | 15 | 15 | 30 | 30 |
| Butadiene-Acrylonitrile Copolymer (70/30) | }33/67 10 | 40 | 67/33 10 | 10/90 5 | 80/20 5 |
| Styrene-Butadiene Copolymer (30/70) | | | | | |
| Dicumyl Peroxide (40% on CaCO$_3$) | 0.40 | 0.40 | 0.40 | 0.40 | 0.40 |
| Magnesium Stearate | 1.00 | 1.00 | 1.00 | 1.00 | 1.00 |
| Antioxidant | 0.25 | 0.25 | 0.25 | 0.25 | 0.25 |
| Magnesium Oxide | 0.20 | 0.20 | 0.20 | 0.20 | 0.20 |
| Tensile at Yield (p.s.i.) | 7,200 | 3,200 | 7,200 | 6,200 | 6,650 |
| Elongation at Break (percent) | 25 | 15 | 20 | 40 | 20 |
| Tensile Modulus (×10$^5$) | 3.4 | 1.6 | 3.3 | 3.2 | 3.2 |
| Notched Izod Impact (ft. lbs./in.) | 7.2 | 5.4 | 8.4 | 4.4 | 5.3 |
| Hardness—Rockwell R Scale | 104 | 35 | 101 | 105 | 106 |

It will be noted from the physical properties set forth in the above table that the blends of this invention will find their greatest usefulness in the fabrication of shaped articles. These articles are most economically produced by injection molding techniques, particularly those rigid articles that are subjected to stresses during assembly and subsequently subjected to vibration, shock, impact loads, and the like during use. The blends of this invention are patricularly adapted to dull (low light reflection) sheet fabrication. The blends may be processed by calendering, vacuum forming, extrusion and similar known production techniques.

While this invention has been described in connection with certain specific details and examples thereof, these details and examples are illustrative only and are not to be considered limitations on the spirit and/or scope of the invention except insofar as they may be incorporated in the appended claims.

What is claimed is:

1. A composite thermoplastic homogeneous rubber-resin blend of:
   (1) from about 5 percent to about 45 percent by weight of a rubbery material of
      (a) from about 90 percent by weight to about 10 percent by weight of a copolymer of conjugated-diene—monovinyl aromatic hydrocarbons and
      (b) correspondingly from about 10 percent by weight to about 90 percent by weight of conjugated-diene—acrylic acid nitrile copolymer, and
   (2) from about 95 percent by weight to about 55 percent by weight of a resinous material of
      (a) from about 45 percent by weight to about 95 percent by weight of a copolymer prepared from a monovinyl aromatic hydrocarbon copolymerized with an acrylic acid nitrile, and correspondingly
      (b) from about 5 percent to about 55 percent by weight of a graft polymer prepared from a polymerized conjugated-diene and a mixture of monovinyl aromatic hydrocarbons and acrylic acid nitriles and
   (3) from 0.2 to 2 percent by weight of a peroxidic catalyst.

2. A composite thermoplastic homogeneous rubber-resin blend of:
   (1) from about 5 percent by weight to about 45 percent by weight of a rubbery material consisting of
      (a) from about 90 percent by weight to about 10 percent by weight of a copolymer consisting of from 95 percent by weight to about 50 percent by weight of a conjugated-diene copolymerized with from about 5 percent by weight to about 50 percent by weight of a monovinyl aromatic hydrocarbon and
      (b) correspondingly from about 10 percent by weight to about 90 percent by weight of a copolymer comprised of from about 20 percent by weight to about 50 percent by weight of an acrylic acid nitrile copolymerized with from about 80 percent by weight to about 50 percent by weight conjugated-diene, and
   (2) from about 95 percent by weight to about 55 percent by weight of a resinous material of
      (a) from about 45 percent by weight to about 95 percent by weight of a copolymer prepared from about 85 percent by weight to about 60 percent by weight of a monovinyl aromatic hydrocarbon copolymerized with from about 15 percent by weight to about 40 percent by weight of an acrylic acid nitrile, and correspondingly
      (b) from about 5 percent by weight to about 55 percent by weight of a graft copolymer prepared from about 20 percent by weight to about 60 percent by weight of a polymerized conjugated-diene and from about 80 percent by weight to about 40 percent by weight of a mixture of monovinyl aromatic hydrocarbons and acrylic acid nitriles, and
   (3) from 0.2 percent by weight to about 2 percent by weight of a peroxidic catalyst.

3. A composite thermoplastic homogeneous rubber-resin blend of:
   (1) from about 5 percent by weight to about 45 percent by weight of a rubbery material comprised of
      (a) from about 90 percent by weight to about 10 percent by weight of a copolymer of from about 60 percent by weight to about 80 percent by weight butadiene copolymerized with from about 20 percent by weight to about 40 percent by weight styrene, and
      (b) correspondingly from about 10 percent by weight to about 90 percent by weight of a copolymer consisting of about 25 percent by weight to about 45 percent by weight acrylonitrile copolymerized with from about 75 percent by weight to about 55 percent by weight butadiene and
   (2) from about 95 percent by weight to about 55 percent by weight of a resinous material of
      (a) from about 45 percent by weight to about 95 percent by weight of a copolymer of from about 80 percent by weight to about 65 percent by weight of styrene copolymerized with from about 20 percent by weight to about 35 percent by weight acrylonitrile, and
      (b) correspondingly from about 5 percent by weight to about 55 percent by weight of a graft copolymer prepared from about 20 percent by weight to about 60 percent by weight of polybutadiene and about 10 percent by weight to about 30 percent by weight acrylonitrile, and from about 30 percent by weight to about 70 percent by weight of styrene, and
   (3) from 0.2 percent by weight to about 2 percent by weight of dicumyl peroxide.

References Cited

UNITED STATES PATENTS

| | | | |
|---|---|---|---|
| 2,802,808 | 8/1957 | Hayes | 260—876 |
| 3,118,854 | 1/1964 | Hess et al. | 260—876 |

GEORGE F. LESMES, Primary Examiner.

U.S. Cl. X.R.

260—880, 82.3, 85.5